Jan. 9, 1951 G. A. COLLENDER 2,537,397
RIBBON INKING MECHANISM IN FRUIT MARKING MACHINES
Filed Nov. 21, 1945 3 Sheets-Sheet 1
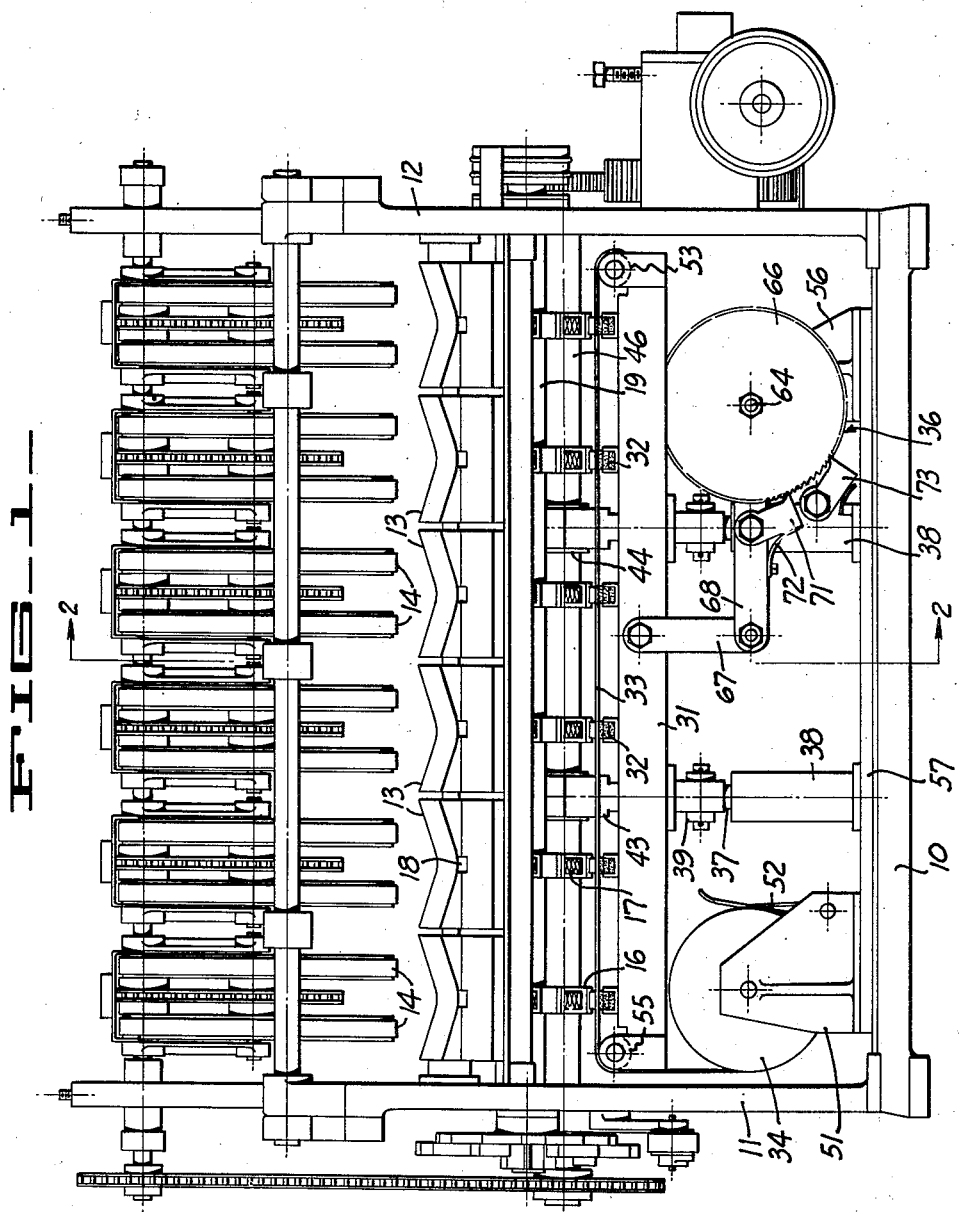
INVENTOR.
Gustave A. Collender
BY
Paul D. Flehr
ATTORNEY

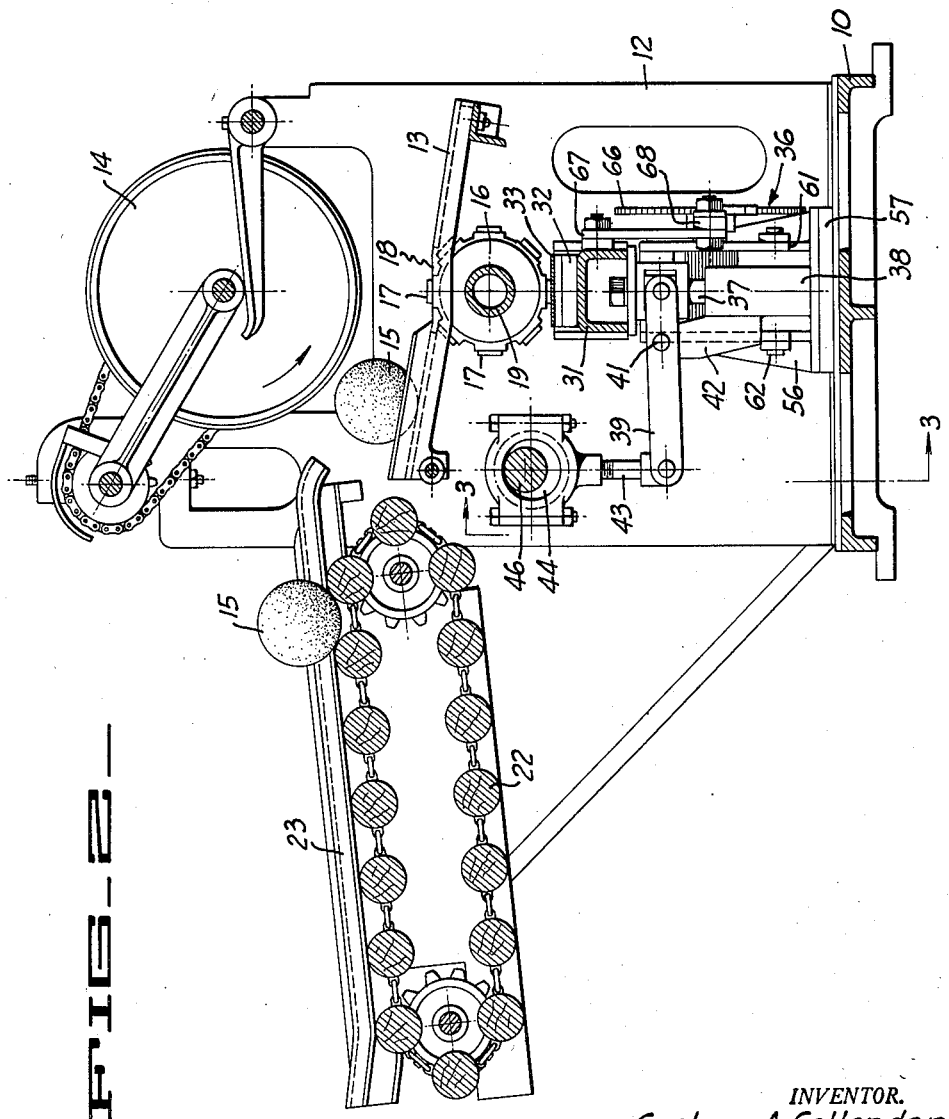

Jan. 9, 1951 G. A. COLLENDER 2,537,397
RIBBON INKING MECHANISM IN FRUIT MARKING MACHINES
Filed Nov. 21, 1945 3 Sheets-Sheet 3
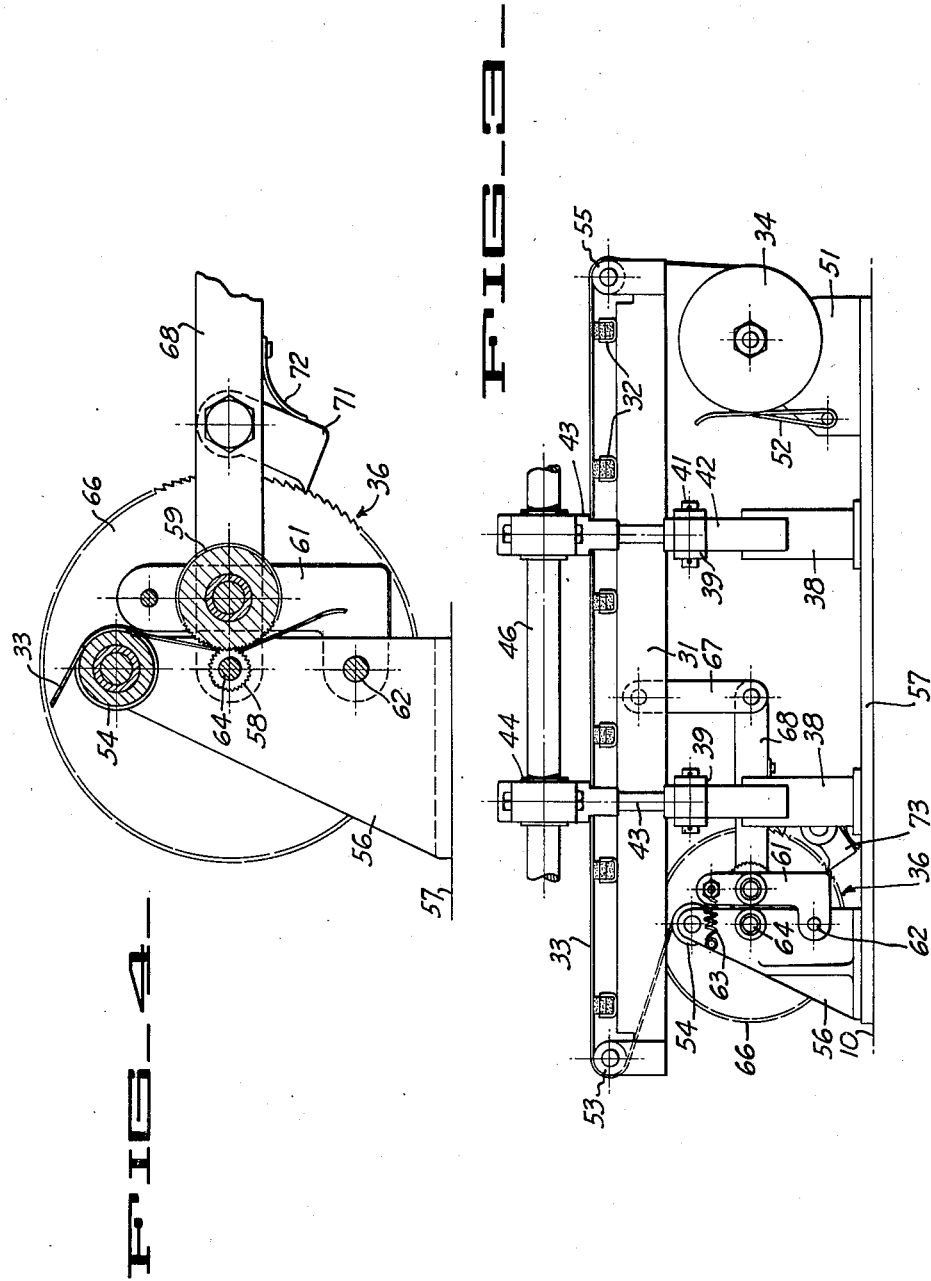
INVENTOR.
Gustave A. Collender
BY
Paul D. Fecher
ATTORNEY Patented Jan. 9, 1951

2,537,397

UNITED STATES PATENT OFFICE 2,537,397

RIBBON INKING MECHANISM IN FRUIT MARKING MACHINES

Gustave A. Collender, Chatsworth, Calif., assignor, by mesne assignments, to Frank Ahlburg, Los Angeles, Calif.

Application November 21, 1945, Serial No. 629,971

4 Claims. (Cl. 101—40)

The present invention relates to fruit marking machines and is concerned more particularly with the provision of an improved arrangement for inking the marking dies of the machine and for mounting and feeding the inking ribbon with respect to the marking dies.

It is a general object of the invention to provide a fruit marking machine embodying an improved inking arrangement for the marking dies.

Another object of the invention is to provide a fruit marking machine having an improved inking arrangement of relatively simple construction and which can advantageously take the place of more complicated inking mechanisms used in the past with fruit marking machines. For example the invention can be used to displace inking mechanisms for fruit marking machines of the type incorporating separate oscillating arms or levers for pressing an inking ribbon against each of the several marking dies.

Other objects of the invention will be apparent from the following description of a preferred embodiment thereof as illustrated in the accompanying drawings, in which:

Figure 1 is an elevational view of a fruit marking machine embodying the improved inking arrangement of the instant invention.

Figure 2 is a sectional view of a fruit marking machine taken as indicated by the line 2—2 in Figure 1.

Figure 3 is an elevational view of the inking arrangement taken as indicated by the line 3—3 in Figure 2.

Figure 4 is a sectional view of the feed rolls for the inking ribbon.

Referring to the drawings the fruit marking machine of the instant invention includes a base plate 10 having opposite end plates 11 and 12 mounted thereon to form the framework of the machine. A series of fruit marking stations of conventional construction are provided on the frame including a series of parallel feeding troughs 13 which extend from side to side of the machine below a corresponding series of feed wheels 14. The latter serve to effect a timed rolling movement of the pieces of fruit 15 through the troughs 13.

The marking of the fruit at each marking station is performed by means including a marking die wheel 16 having a series of marking dies 17 mounted thereon in the usual fashion so that the uppermost die 17 projects through an opening 18 in the associated trough 13 to mark a piece of fruit as it rolls thereover. The die wheels 16 have a common drive shaft 19 which is driven through a conventional Geneva mechanism to move intermittently in time with the other operative mechanisms of the machine.

The pieces of fruit 15 are fed to the respective troughs 13 by means including a roller conveyor 22 of conventional construction having a plurality of dividing bars 23 disposed above the upper stretch thereof to provide separate paths leading to the respective troughs 13. The drive for the conveyor 22 is of a conventional form and provides a timed feeding of fruit onto the troughs 13 to be advanced by the feed wheels 14 over the respective aligned marking dies 17.

In order to supply ink to the marking dies 17 an inking mechanism is provided including a supporting table 31 having a plurality of resilient pads 32 mounted thereon in alignment with the corresponding marking die wheel 16. An inking ribbon 33 extends lengthwise of the table 31 across the tops of the pads 32 between a supply reel 34 and a ribbon advancing means 36 referred to in greater detail hereinafter. Table 31 is carried by a pair of vertical posts 37 slidably carried in vertically disposed tubular guides 38. The posts 37 are each pivotally connected to one end of an operating link 39 pivotally mounted at 41 on a bracket 42 and pivotally connected to a crank arm 43 which engages and is operated by an eccentric 44 fixed to a transverse shaft 46. The shaft 46 is suitably mounted for rotation and has a suitable drive connection to be operated in time with the advance of the series of marking dies 17 to lift the table 31 and engage the ribbon 33 with the lowermost marking die 17 when the wheel 16 is stationary.

Referring more particularly to the feeding and control of advance of the inking ribbon 33 it will be recalled that the supply of inking ribbon is provided by the reel 34 which is journaled on a suitable bracket 51 and has associated therewith a spring friction device 52 to maintain the ribbon 33 taut across the pads 32 and between the respective guide rolls 55 and 53 at the feed and discharge ends respectively of the table 31. From the roller 53 the ribbon 33 extends reversely beneath the table 31 to a guide roll 54 which is journaled on a bracket 56 carried by the base plate 57 of the inking arrangement, and thence downwardly between a pair of corrugated feed rolls 58 and 59 to a suitable point of discharge. The small feed roll 58 is journaled in the bracket 56 while the large feed roll 59 is journaled between a pair of supporting arms 61 which are pivotally mounted at 62 in the respective bracket 56, the arms 61 being spring urged counter-clockwise as viewed in Figure 3 by a spring 63 so that the feed roll 59 is engaged resiliently with the feed roll 58.

To effect a timed intermittent drive of the feed rolls, the shaft 64 of the feed roll 58 carries a large ratchet 66. The drive ratchet 66 (Figures 1 and 4) is adapted to be advanced a uniform amount during the return movement of the table 31 from its position in which the ribbon 33 is engaged with respective marking dies 17, a uniform advance of the ribbon being provided during each step of movement thereof. For this purpose the table 31 is connected by a link 67 with one end of an operating arm 68 which has its other end pivotally mounted on the shaft 64. The operating arm 68 carries a ratchet advancing pawl 71 urged against the ratchet wheel 66 by spring 72 so that during the downward movement of the table 31 the arm 68 will be lowered and through the pawl 71 the ratchet wheel 66 will be advanced. Correspondingly the feed rolls 58 and 59 are moved to cause an advance of the ribbon past the respective pads 32 so that a fresh portion of the inking ribbon will be available for supplying ink to the marking dies. A spring urged pawl 73 prevents backward movement of the ratchet 66 during the return stroke of the actuating pawl 71.

To summarize briefly the operation of the marking machine as described above fruit such as oranges is supplied to the feed conveyor 22 in the respective troughs formed on the upper stretch thereof and is delivered by the feed conveyor 22 to the marking troughs 13. The fruit is advanced along the troughs 13 by the feed rolls 14 which roll the fruit over the aligned marking dies 17. During the time that this operation is taking place the inking table 31 is raised by operation of the eccentric 44 on the intermittently operated shaft 46 so that the inking ribbon 33 is contacted with the marking die 17 in the bottom position on the wheel 16.

During the lowering movement of the inking table 31 the actuating arm 68 and the pawl 72 operates to advance the ratchet 66 and thereby the feed rolls 58 and 59 to cause movement of the inking ribbon 33 across the support pads 32 so that a uniform advancing action of the inking ribbon is obtained throughout the operation of the machine. The used ribbon which is discharged between the feed rolls 58 and 59 is permitted to discharge to a suitable refuse receptacle.

While I have described my invention as illustrated in the preferred embodiment thereof, it will be apparent that the invention is capable of both variation and modification from the form shown, and its scope therefore should be limited only by the scope of the claims appended hereto.

It will be apparent that my inking mechanism is relatively simple and effective compared to the arrangements which have been used in the past. For example it eliminates use of separate arms or levers for pressing the inking ribbon into contact with each die (see for example Patent 1,926,356). Such separate pressing levers are objectionable because of noisy operation and because each lever requires separate adjustment for proper pressure. With my mechanism operation is relatively quiet and a single adjusting operation suffices to adjust the pressure applied in inking all of the various dies.

I claim:

1. In a fruit marking machine of the type in which fruit is fed to a plurality of fruit marking stations and are there engaged by inked marking dies, the dies being carried by a plurality of aligned and intermittently driven die wheels, of inking means for said die wheels comprising a table extending horizontally beneath the wheels and adapted to be reciprocated vertically toward and away from the wheel, an inking ribbon extending over the table whereby it is pressed against the wheels when the table is raised, a ribbon supply wheel from which the ribbon extends, a pair of feed rolls between which the ribbon is passed after traversing the table, and motion applying means actuated by reciprocation of the table and serving to effect rotation of the feed rolls when the table moves downwardly.

2. In a fruit marking machine of the type in which fruit is fed to a plurality of fruit marking stations and are there engaged by inked marking dies, the dies being carried by a plurality of aligned and intermittently driven die wheels, of inking means for said die wheels comprising a table extending horizontally beneath the wheels and adapted to be reciprocated vertically toward and away from the wheels, an inking ribbon extending over the table whereby it is pressed against the wheels when the table is raised, a ribbon supply wheel from which the ribbon extends, a pair of feed rolls between which the ribbon is passed after traversing the table, and motion applying means actuated by reciprocation of the table and serving to effect rotation of the feed rolls when the table moves downwardly, said last named means including ratcheting means connected to drive the feed rolls and motion applying levers connecting the table and said ratcheting means for actuating the latter for intermittent rotation of said feed rolls.

3. In a fruit marking machine of the type in which fruit is fed to a plurality of fruit marking stations and are there engaged by inked marking dies carried by a plurality of aligned and intermittently driven die wheels, of inking means for said die wheels comprising a table adapted to extend horizontally beneath the wheels and mounted for reciprocation vertically toward and away from the wheels, an inking ribbon extending over the table whereby it is positioned to be pressed against the wheels when the table is raised, resilient pads carried by the upper face of the table and adapted to resiliently press the inking ribbon against the marking dies, guide rolls mounted adjacent the ends of the table and over which the inking ribbon is tracked, a ribbon supply reel from which the ribbon extends, a pair of feed rolls between which the ribbon passes after traversing the table, ratcheting means serving to effect intermittent rotation of said feed rolls, said ratcheting means including a pawl adapted to be moved to advance the feed rolls, and lever means connecting said pawl to said table whereby said pawl is moved to advance the feed rolls when the table moves downwardly and a second pawl pivoted to a fixed support and adapted to prevent reverse rotation of one of said feed rolls.

4. In a fruit marking machine of the type in which fruit is fed to a plurality of fruit marking stations and are there engaged by inked marking dies, the dies being carried by a plurality of aligned and intermittently driven die wheels, of inking means for said die wheels comprising a table extending horizontally beneath the wheels and adapted to be reciprocated vertically toward and away from the wheels, an inking ribbon extending over the table whereby it is pressed against the wheels when the table is raised, a ribbon supply wheel from which the ribbon extends, a pair of feed rolls between which the ribbon is passed after traversing the table, and motion applying means actuated by reciprocation of the table and serving to effect rotation of the feed rolls when the table moves downwardly, said last named means including ratcheting means connected to drive the feed rolls, and motion applying levers connecting the table and said ratcheting means for actuating the latter for intermittent rotation of said feed rolls, last named means including friction means applied to the ribbon to permit slippage of the ribbon when the table is raised vertically and to prevent excessive slippage when the table is raised vertically.

GUSTAVE A. COLLENDER.

REFERENCES CITED

The following references are of record in the file of this patent:

UNITED STATES PATENTS

| Number | Name | Date |
|---|---|---|
| 966,795 | Canfield | Aug. 9, 1910 |
| 1,185,260 | Stine | May 30, 1916 |
| 1,231,797 | Shelley | July 3, 1917 |
| 1,288,616 | Kirkbride | Dec. 24, 1918 |
| 1,421,292 | Neuenschwander | June 29, 1922 |
| 1,537,603 | Hale | May 12, 1925 |
| 1,580,759 | Olson | Apr. 13, 1926 |
| 1,658,468 | Tarlton | Feb. 7, 1928 |
| 1,755,456 | Nutt | Apr. 22, 1930 |
| 1,755,749 | Sevigne | Apr. 22, 1930 |
| 1,822,329 | Constable | Sept. 8, 1931 |
| 1,926,356 | Tarlton | Sept. 12, 1933 |
| 1,978,790 | Gould | Oct. 30, 1934 |
| 2,035,957 | Gabrielson | Mar. 31, 1936 |
| 2,111,556 | Crosby | Mar. 22, 1938 |
| 2,117,375 | Steiner | May 17, 1938 |